No. 628,779. Patented July 11, 1899.
J. ESSEX.
BALL CHECK VALVE.
(Application filed May 5, 1898.)
(No Model.)
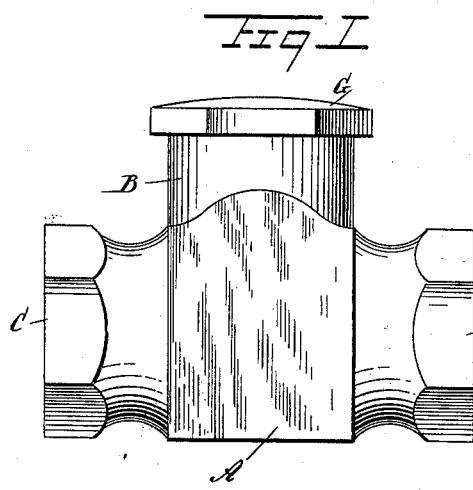
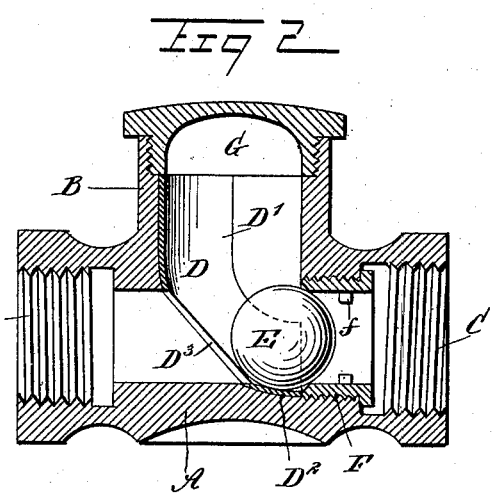
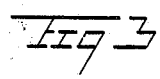
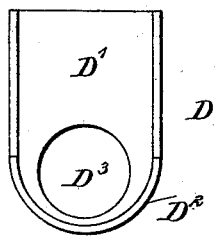
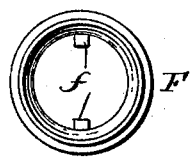
WITNESSES:
H. Walker
H. L. Reynolds.
INVENTOR
J. Essex.
BY
ATTORNEYS.

UNITED STATES PATENT OFFICE.

JAMES ESSEX, OF LONDON, CANADA.

BALL CHECK-VALVE.

SPECIFICATION forming part of Letters Patent No. 628,779, dated July 11, 1899.

Application filed May 5, 1898. Serial No. 679,791. (No model.)

*To all whom it may concern:*

Be it known that I, JAMES ESSEX, a subject of the Queen of Great Britain, residing at London, in the Province of Ontario and Dominion of Canada, have invented a new and Improved Ball Check-Valve, of which the following is a full, clear, and exact description.

My invention relates to an improvement in ball check-valves, having for its object to provide a straightway passage which shall be of full area and shall not check the flow of the liquid therethrough.

My invention consists of novel features which will be hereinafter described, and pointed out in the claims.

Reference is to be had to the accompanying drawings, forming a part of this specification, in which similar characters of reference indicate corresponding parts in all the figures.

Figure 1 is a side elevation of my improved check-valve. Fig. 2 is a longitudinal vertical section. Fig. 3 is a front view of the ball-raceway removed, and Fig. 4 is a detail view of the removable ring forming the valve-seat.

The body A of the check-valve is provided with a free passage of a size corresponding to the opening in the pipes with which it is to be used and terminating at each end in threaded sections C, adapted to receive the pipes. The body of the valve is provided with a chamber or extension B, adapted to receive the ball-raceway and the ball which forms the valve. This chamber is of larger diameter than the straightway passage through which the liquid passes and is provided with a ball-raceway curved downward and toward one end of the raceway-passage. This ball-raceway may be formed integral with the body of the valve; but it is preferred to form it of a separate plate D, as shown in Fig. 2. The plate D is of thin metal curved so as to fit the ball and forms approximately a quarter of a circle. Its upper portion D' is therefore vertical, while its lower portion $D^2$ is approximately horizontal. The plate D is also provided with a hole $D^3$, corresponding in location and size to the straightway passage through the body of the valve.

In the end of the passage adjacent to the lower end of the ball-raceway is provided a valve-seat. This may also be formed integral with the body of the valve; but in many cases it is preferred to have it upon a separate ring F, as shown in Fig. 2. This ring F screws into the body of the valve and has the valve-seat formed upon its inner end. The entire ring screws within the body of the valve, it being entirely within the pipe which screws into this end of the valve. The end of the pipe will abut upon the end of the ring. For convenience in inserting and removing the ring it is provided with lugs *f* or other irregularities of surface which will enable it to be engaged by a socket or spanner. The upper end of the chamber B is closed by a cap G, which preferably screws thereon.

In operation the valve E will be readily raised by the pressure of water or other liquid on one side thereof and will roll upward on the raceway D, and consequently leave a free and unobstructed passage for the water, and will promptly drop downward to place as soon as the flow stops. It will also form a perfect seat, and thus prevent the possibility of any backflow of the water. The ball will be constructed of iron, brass, or other suitable material, but should be of greater specific gravity than the liquid with which it is to be used, and the valve-body will be constructed of any suitable material or combination of materials, as found desirable.

Having thus fully described my invention, I claim as new and desire to secure by Letters Patent—

1. A check-valve comprising a body having a straightway passage therethrough, an inwardly-facing valve-seat in one end of said passage, an upwardly-extending connected chamber, a curved ball-raceway leading from said chamber to the valve-seat, and a ball within said chamber adapted to fit the valve-seat and to be forced up the raceway into the connected chamber to clear the straightway passage.

2. A check-valve comprising a body having a straightway passage therethrough, an inwardly-facing valve-seat near one end of said passage, an upwardly-extending connected chamber, a separable curved plate within said chamber, forming a ball-raceway leading to the valve-seat and having a hole therein conforming to the straightway passage, and a ball within said chamber adapted to fit the valve-seat.

3. A check-valve comprising a body having a straightway passage therethrough, a ring adapted to screw into one end of the passage, and having a valve-seat formed on its inner edge, the body having an upwardly-extending connected chamber, a curved ball-raceway leading from the chamber to the valve-seat, and a ball within said chamber adapted to fit the valve-seat.

4. A check-valve comprising a body having a straightway passage therethrough and a side extending chamber connected therewith, a ring adapted to screw into one end of the passage and having a valve-seat formed on its inner edge, a separable curved plate within the side extending chamber and forming a ball-raceway leading to the valve-seat and also having a hole therein conforming to the straightway passage, and a ball within said chamber adapted to fit the valve-seat.

5. A check-valve comprising a body having a straightway passage therethrough, a ring adapted to screw into one end of the passage, and having a seat formed on its inner edge, said ring entering the body so as to permit of screwing a pipe into the body outside thereof, and having surface irregularities adapted to be engaged by a wrench or spanner, the valve-body having an upwardly-extending connected chamber having a curved ball-raceway leading to the valve-seat, and a ball within the chamber adapted to fit the valve-seat.

JAMES ESSEX.

Witnesses:
T. J. MURPHY,
FRANK McL. SPRY.